(No Model.)
H. MONK.
INJECTOR OVERFLOW ATTACHMENT.
No. 499,640. Patented June 13, 1893.
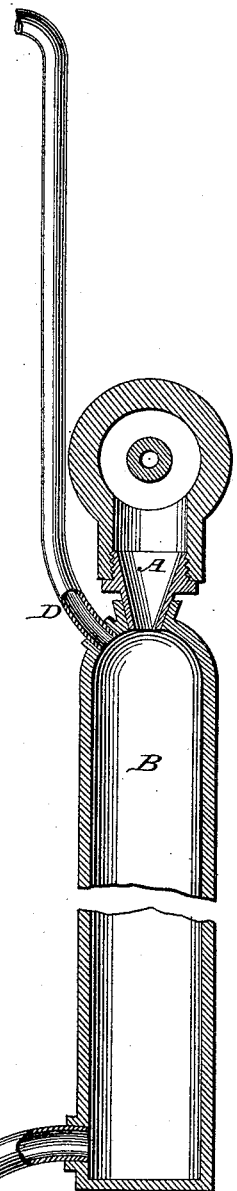
Witnesses.
John Monk
John A Brady
Inventor.
Henry Monk

UNITED STATES PATENT OFFICE.

HENRY MONK, OF CHICAGO, ILLINOIS.

INJECTOR OVERFLOW ATTACHMENT.

SPECIFICATION forming part of Letters Patent No. 499,640, dated June 13, 1893.

Application filed February 6, 1893. Serial No. 461,208. (No model.)

*To all whom it may concern:*

Be it known that I, HENRY MONK, a citizen of the United States, residing at 2234 Dearborn street, Chicago, in the county of Cook and State of Illinois, have invented certain new and useful Improvements in Attachments to Steam-Boiler Injectors, of which the following is a specification.

My invention relates to the improvements of an overflow or waste water attachment and its use will be most beneficial on locomotives in elevated railroad service. The object is to retain the best efficiency of the injector and to avoid all loss and splashing of water and the rush of escaping steam in or about the cab which obscure the vision of the engineer when the injector is put in operation.

To this end in an injector the chief feature of my invention generally stated consists in an overflow attachment wherein the overflow or waste water is returned to the water tank by a pipe connected to the injector overflow nozzle, which acts as a preliminary reservoir for the overflow water, said reservoir having a suitable connection at the lower end leading to the water tank. At the upper end of this preliminary reservoir is connected a waste steam escape pipe which leads to some distance above the injector or roof of cab to the atmosphere or it can be returned to the top of the water tank, or in the ash pan or any other suitable place if sufficient vent is given.

In the accompanying drawing the figure is an end elevation of an injector overflow nozzle with my improvement attached.

Similar letters refer to similar parts.

A is the injector overflow nozzle.
B is the reservoir.
C is the overflow water return pipe.
D is the waste steam or relief pipe.

To form a clear idea of the action and object of this invention it must be supposed that the injector is on the point of being primed, in which case steam escapes from the nozzle A into reservoir B and thence to the atmosphere through escape pipe D. Soon as the injector primes the overflow water enters the reservoir and passes to the water tank through pipe C until a sufficient force or impetus is given to the water to start the injector. Working by this arrangement it will be seen there is no waste steam in or about the cab to obscure the vision of the engineer and to annoy passengers standing on station platforms and the constant annoyance to the public by the splashing and dripping of water is avoided.

What I claim, and desire to secure by Letters Patent, is as follows:

In an injector overflow attachment, the steam relief or vent pipe D, the reservoir B, and the return pipe C, all arranged substantially for the purpose as described.

H. MONK.

Witnesses:
JOSEPH LANIER,
W. BELL.